United States Patent [19]

Yamashita et al.

[11] 4,101,914
[45] Jul. 18, 1978

[54] INDICATING DEVICES FOR USE IN CAMERAS

[75] Inventors: Maki Yamashita, Sakai; Yasuzi Kogure, Kawanishi, both of Japan

[73] Assignee: Minolta Camera Kabushiki Kaisha, Japan

[21] Appl. No.: 782,298

[22] Filed: Mar. 23, 1977

[30] Foreign Application Priority Data

Mar. 31, 1976 [JP] Japan ............................. 51-40040[U]

[51] Int. Cl.² .............................................. G03B 15/02
[52] U.S. Cl. .................................. 354/128; 354/273; 354/289; 354/354
[58] Field of Search ............... 354/127, 128, 198, 273, 354/289, 354, 149

[56] References Cited

U.S. PATENT DOCUMENTS

| | | | |
|---|---|---|---|
| 3,443,497 | 5/1969 | Bihlmaier | 354/128 |
| 3,535,990 | 10/1970 | Kunze | 354/128 |
| 3,906,526 | 9/1975 | Toyoshima et al. | 354/273 X |
| 4,041,508 | 8/1977 | Edamoto et al. | 354/273 X |

*Primary Examiner*—Richard A. Wintercorn
*Attorney, Agent, or Firm*—Watson, Cole, Grindle & Watson

[57] ABSTRACT

A camera adapted for use with a photoflash device, and having structure for manually setting a diaphragm aperture externally of the camera includes: a switch for switching the camera from a daylight photography mode to a flash photography mode, and vice-versa; a diaphragm setting member movable for setting the diaphragm aperture; a first scale member for indicating a set position of the diaphragm aperture setting member for daylight photography, and a second scale member for indicating a set position of the diaphragm setting member for flash photography. Additionally, the camera is provided with structure for selectively exposing one of the two scale members in response to selection of the photography mode of the camera. The exposing structure is interconnected with the switch for automatic, selective indication of the scale members.

19 Claims, 15 Drawing Figures

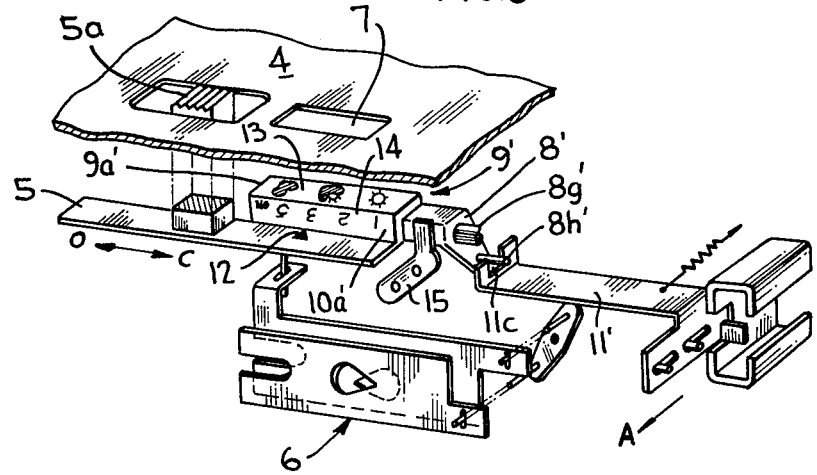
FIG.5
FIG.6A  FIG.6B  FIG.7A  FIG.7B
FIG.8
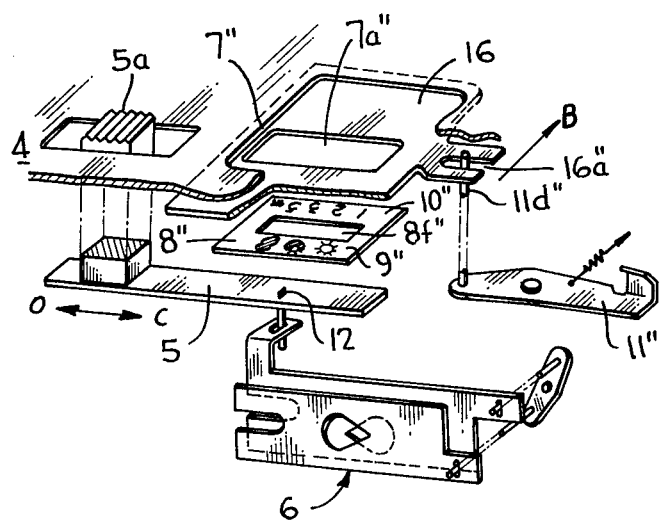

INDICATING DEVICES FOR USE IN CAMERAS

BACKGROUND OF THE INVENTION

This invention relates to a diaphragm setting device for use in a camera.

Previously, cameras have been proposed in which exposure adjustment is effected by manually operating the diaphragm, and the diaphragm setting operation is simplified due to the provision of a diaphragm setting scale that is exclusively used for photographing without flash-light (hereinafter referred to as daylight photography, but that photography mode may include photographing with artificial ambient light) and a diaphragm setting scale that is exclusively used for flash photography.

However, in the prior art, cameras are provided with scale indicating portion 2, for indicating a set position of diaphragm setting member 1 for daylight photography, and another scale indicating portion 3, for indicating a set position of the diaphragm setting member for flash photography. Both indicating portions 2 and 3 are visible externally simultaneously so that the photographer has to make a decision in selecting either one of the two scales upon setting the diaphragm, commensurate with a desired photography mode.

This, however, is difficult for a photographer who is not familiar with the functions of the two scale indicating portions, because he or she might not know which one of the indicating portions should be used for photographing. As a result, the photographer is likely to make an erroneous setting of the diaphragm. In this respect, even a photographer who is familiar with the functions of the scale indicating portions is no exception and may make the above mistake. In other words, there is the problem that the photographer uses, by mistake, a scale indicating portion for use in flash photography instead of the scale indicating portion for daylight photography, or vice-versa, with the resultant failure to achieve a picture which has been taken at a proper exposure level.

SUMMARY OF THE INVENTION

It is an object of the present invention to provide a diaphragm setting device for use in a camera for selectively indicating a scale for daylight photography and another scale for flash photography.

It is another object of the present invention to provide a diaphragm setting device for use in a camera, in which switching from a scale for daylight photography to a scale for flash photography and vice-versa can be carried out automatically in accordance with the normal switching operation of a camera, from a daylight photography mode to a flash photography mode and vice-versa, thereby dispensing with an additional operation for switching the scales.

It is a further object of the present invention to provide a diaphragm setting device for use in a camera, in which switching of the scales is carried out in cooperation with the switching operation within the body proper of a camera, i.e., from a daylight photography mode to a flash photography mode and vice-versa, and only the proper scale is indicated, commensurate with the selected photography mode of the camera.

A still further object of the present invention is to provide a diaphragm setting device for use in a camera, in which even a photographer who has no knowledge of the functions of the two scales will not select a wrong scale for photographing, so that a proper scale accommodating a desired photography mode of the camera may be used for optimum exposure.

It is yet a further object of the present invention to provide a diaphragm setting device for use in a camera, which may prevent erroneous setting of scales, either by a careless mistake, or even by a very experienced photographer.

According to one embodiment of the present invention, a scale for use in daylight photography and another scale for use in flash photography are observed at different positions, respectively, so that the position of the scale indicates to the photographer which photography mode has been set.

BRIEF DESCRIPTION OF THE DRAWINGS

FIG. 5 is a perspective view illustrative of another embodiment of the invention;

FIGS. 6A,B and 7A,B are views of scale indicating conditions for the embodiment of FIG. 5, in which FIGS. 6A,B, relate to a daylight photography mode and FIGS. 7A,B refer to a flash photography mode; FIGS. 6A and 7A showing the daylight and photography mode scales, respectively, as viewed through an indicating window and FIGS. 6B and 7B showing the diaphragm setting member, the movement of which in either direction C or D causes adjustment of index 12 with respect to the associated scale of FIGS. 6A, 7A; and FIGS. 8 to 11 are perspective views of still further embodiments of the invention.

DESCRIPTION OF THE PREFERRED EMBODIMENTS

Figure 1:
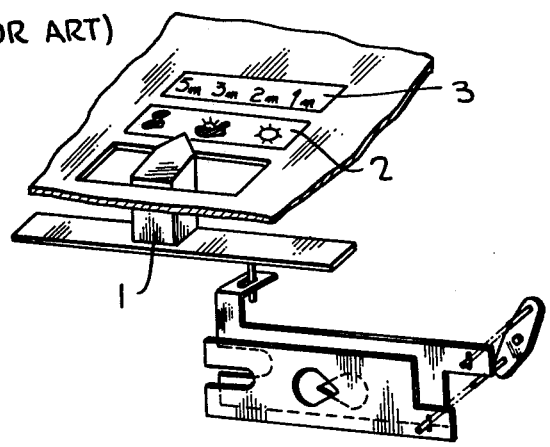
FIG. 1 is a perspective view of a prior art diaphragm setting device.
Figure 2:
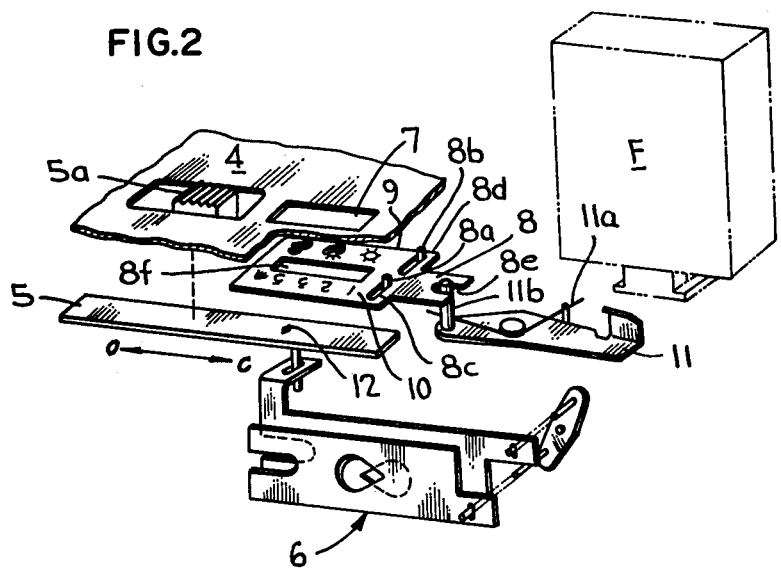
FIG. 2 is a perspective view of one embodiment of the diaphragm setting device according to the present invention.

Referring to FIG. 2, diaphragm setting member 5 is mounted to surface 4 of the camera body (not shown) and is adapted to be operated from outside the camera body and is slidable in either of two directions as indicated by arrows O, C. Known diaphragm mechanism 6 is adapted to cooperate with diaphragm setting member 5, and increases the diaphragm aperture when diaphragm setting member 5 is moved in the direction O, and decreases the diaphragm aperture when diaphragm setting member 5 is moved in the direction C by manual movement of diaphragm setting button 5a. Indicating window 7 is provided in camera body 4. Indicating member 8 has two different scales 9, 10 and is constrained to slidingly move in a direction such that only either one of scales 9, 10 is visible through indicating window 7, by the engagement of pins 8a, 8b (mounted to the camera body) with slots 8c, 8d, respectively, of indicating member 8. Daylight-photographing diaphragm scale 9 is used in daylight photography, and consists of symbol marks such as pictures of the sun, clouds and the like. Diaphragm scale 10 is used for flash photography, which indicates the set position of diaphragm setting member 5 and includes distance graduations. The distance graduations are predetermined in association with the diaphragm apertures to obtain optimum exposure for an object at the indicated distance, when the diaphragm setting member is set. Scales 9 and 10 are marked on indicating member 8 and spaced a given distance from each other so that one of the scales may be selectively indicated in indicating window 7, when indicating member 8 is moved to one of the extremities of its stroke within slots 8c and 8d. Control lever 11 moves indicating member 8 in association with the switching from a daylight photography mode to a flash photography mode of the camera, and vice-versa. Control lever 11 is rotatable through a given angular displacement in association with indicating member 8 and is biased by a spring to rotate counterclockwise. Control lever 11 is actuated by an attaching leg of a flash means F, when the flash means is fitted in an accessory shoe on the camera body, so that control lever 11 rotates clockwise through a given angular displacement against the force of spring 11a. Control lever 11 moves indicating member 8 by the engagement of pin 11b in slot 8e. Control lever 11 is so arranged that, when the flash means is not mounted, daylight photography diaphragm scale 9 appears in indicating window 7, and that when control lever 11 is rotated clockwise through a given angular displacement due to the flash means being mounted, flash photography diaphragm scale 10 appears in indicating window 7 by the aforesaid clockwise rotation of control lever 11. Index 12 is provided on diaphragm setting member 5 and is viewed outside the camera through aperture 8f in indicating member 8 between scales 9, 10 and through window 7.

Figure 3A:
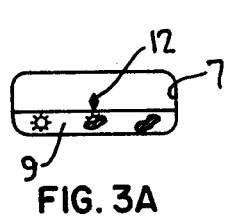
FIGS. 3A,B and 4A,B are plan views illustrative of the scale indicating conditions for the embodiment of FIG. 2, in which FIGS. 3A,B relate to a daylight photography mode, and FIGS. 4A,B relate to a flash photography mode of the camera, FIGS. 3A and 4A showing the daylight and photography mode scales, respectively, as viewed through an indicating window, and FIGS. 3B and 4B showing the diaphragm setting member, the movement of which in direction C or D causes adjustment of index 12 with respect to the associated scale of FIGS. 3A, 4A.
Figure 3B:
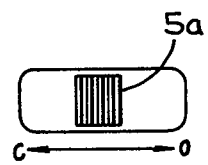

With the diaphragm setting device thus arranged, for taking a picture in daylight, the flash means is not fitted on the camera body, and control lever 11 is biased counterclockwise, as shown in FIG. 2, with the result that daylight photography diaphragm scale 9 is viewed through indicating window 7, and a particular symbol of scale 9 is viewed as being aligned with index 12 on diaphragm setting member 5, as shown in FIG. 3A. FIG. 3A also shows that only photography diaphragm scale 9 and index 12 are visible from indicating window 7. Movement of diaphragm setting button 5a in either direction C or D (FIG. 3B) causes index 12 to be aligned with a proper symbol on scale 9.

Figure 4A:
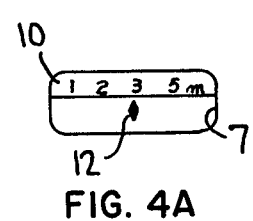
Figure 4B:
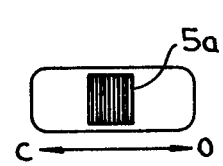

For flash photography, flash means F is mounted on an accessory shoe (not shown) in FIG. 2, so that control lever 11 is actuated by an attaching leg of flash means F to rotate clockwise through a given angular displacement. In association therewith, indicating member 8 is moved by the engagement of pin 11b in slot 8e to slide such that pins 8a, 8b engage the other ends of slots 8c, 8d, respectively. Thus, daylight-photography diaphragm scale 9 is moved out of view in indicating window 7, and flash-photography diaphragm scale 10 is positioned to be viewed through indicating window 7. FIG. 4A shows that condition of a camera, in which only flash-photography diaphragm scale 10 and index 12 are visible from indicating window 7. Movement of diaphragm setting button 5a in either direction C or D (FIG. 4B) causes index 12 to be aligned with a proper distance graduation on scale 10.

Also, in this embodiment, as shown in FIGS. 3A and 4A, the indicated positions of scales 9, 10 respectively appear at opposite sides of the contour of indicating window 7. Alternatively, the slidable extent of indicating member 8 may be increased, while another aperture enabling index 12 to be constantly viewed therethrough may be provided in indicating member 8, so that each of scales 9, 10 may be respectively indicated from the same position in indicating window 7.

According to the aforesaid embodiment, the daylight photography scale and flash photography scale are both provided on a single indicating member, in a manner such that with the sliding movement of the indicating member, either one of the two scales may be selectively viewed within the indicating window. Thus, by properly adjusting the sliding movable extent of the indicating member, either scale may be selectively viewed in suitable positions within the indicating window, thereby preventing varying viewing positions for the scales. With each of the scales being viewed in different positions within an indicating window with respect to one another as in this embodiment, the photographer may clearly distinguish one scale from the other, because of the spacedapart indicated positions of the scales. This provides a subsidiary advantage in that the photographer will be able to accomplish the diaphragm setting operation without a mistake as to which scale is being viewed through indicating window 7.

In the aforesaid embodiment, two scales are provided in a single indicating member adapted to be slidingly moved to selectively indicate one of those scales. However, the present invention is by no means limited to such structure as the indicating member may be arranged to be rotated as shown in FIG. 5, wherein like parts are designated like reference numerals with the previously described embodiments. Referring to FIG. 5, indicating member 8' is rotatably supported on shaft 8'g mounted to the camera body (not shown) and includes cubic member 9' having either curved or flat surfaces around its periphery. Indicating member 8' is located directly under indicating window 7 so that at least one of the surfaces of cubic member 9' constantly appears in indicating window 7. Control lever 11' is connectable with indicating member 8' by the engagement of pin 8'h with slot 11'c. Control lever 11' is moved in the direction A, when a flash means (not shown) is fitted in an accessory shoe on the camera body as in the previously described embodiment. Movement of control lever 11' in the direction A causes indicating member 8' and cubic member 9' to rotate so as to expose a different scale 9'a, 9'b, etc. through indicating window 7. Daylight-photography scale 9'a is provided on first indicating surface 13 of indicating member 8' such that scale 9'a appears through indicating window 7 in its stopped position as shown in FIG. 5. Flash-photography scale 10'a is provided on a second surface 14 such that scale 10'a appears through indicating window 7, when rotated from its position as shown in FIG. 5 to the position of scale 9'a as shown in the same Figure. Click spring 15 (mounted to the camera body) accurately positions first and second indicating surfaces 13, 14 with respect to indicating window 7.

With the aforesaid arrangement, in the daylight photography condition shown in FIG. 5, control lever 11' is not actuated (the flash means is not mounted to the camera body), so that first indicating surface 13 and scale 9'a of indicating member 8' appear through indicating window 7. FIG. 6A shows the daylight photography condition of a camera, in which only daylight photography scale 9'a and diaphragm setting index 12 are visible through indicating window 7. Movement of diaphragm setting member 5 in either direction C or D (FIG. 6B) causes index 12 to be aligned with a proper symbol on scale 9'a.

For flash photography, a flash unit is fitted in an accessory shoe (not shown) so that control lever 11' is moved in direction A as described previously. When control lever 11' is moved in direction A, indicating member 8' and cubic member 9' are rotated clockwise through a given angular displacement, so that second indicating surface 14 and scale 10'a appear through indicating window 7, in place of first indicating surface 13 and scale 9'a. FIG. 7A shows the flash photography condition of the camera, in which only flash-photography scale 10'a and index 12 are visible through indicating window 7. Movement of diaphragm setting member 5 in either direction C or D (FIG. 7B) causes index 12 to be aligned with a proper symbol on scale 10'a.

With the aforesaid arrangement, the selective indication of both diaphragm scales may be achieved with only the rotation of the indicating member, with the result that the space occupied by the indicating member for its operation is reduced, as compared with such an arrangement, in which the indicating member is slidingly moved. As a result, a diaphragm setting device according to the invention may be built in the camera, without increasing the size thereof.

In the above-described embodiment of the invention, two scale means for flash photography and daylight photography are provided on a single indicating member, and the selective indication of the scale means is enabled by moving the indicating member. However, the present invention is by no means limited to such embodiments, as the scales may be provided on the camera body. FIG. 8 shows still another embodiment of the invention, wherein the scales are mounted on the camera body. More specifically, indicating member 8" is secured to the camera body, with aperture 8"f therein over index 12 on diaphragm setting member 5. Daylight-photography diaphragm scale 9" and flash-photography diaphragm scale 10" are carried on indicating member 8" with aperture 8"f interposed therebetween. Indicating window 7" is located right above indicating member 8, and opening 7"a of indicating window 7" is large enough that diaphragm scales 9" and 10" can each be viewed. In this embodiment, indicating window 7" is located in shielding member 16 which is interposed between camera body 4 and indicating member 8". Shielding member 16 is adapted to be slidingly moved to a given extent in direction B from the position shown in FIG. 8. When shielding member 16 remains in the position shown, it only shields diaphragm setting member 10", such that index 12 and daylight-photography diaphragm scale 9" appear through indicating window 7", and hence are viewed from outside the camera. When shielding member 16 is moved in direction B, shielding member 16 only shields daylight-photography diaphragm scale 9", such that only index 12 and flash-photography diaphragm scale 10" appear through indicating window 7". Thus, both diaphragm scales are selectively indicated through the indicating window. Control lever 11" engages shielding member 16 through elongated pin 11'd within slot 16"a and moves shielding member 16 the necessary distance in direction B, only when a flash means is mounted on the camera body as in the previous embodiments.

Figure 9:
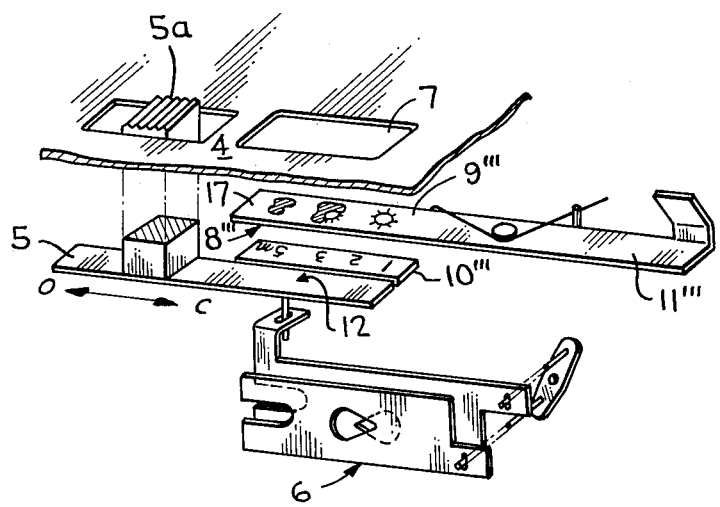

FIG. 9 shows yet another embodiment of the present invention. The preceding embodiments provide two scales which are both either movable or both scales are fixed, whereas in the embodiment of FIG. 9 there are two scales, one of which is fixed and the other of which is movable, thereby providing the selective indication of the scales. In FIG. 9, indicating member 8''' is fixedly position in close vicinity to the locus of movement of index 12 on diaphragm setting member 5, and flash-photography diaphragm scale 10''' is provided on indicating member 8'''. Shielding portion 17 forms part of one end of control lever 11. Shielding portion 17 is constantly maintained above indicating member 8''', thereby shielding flash-photography diaphragm scale 10'''. Daylight-photography diaphragm scale 9''' is provided on shielding portion 17 such that diaphragm scale 9''' appears through indicating window 7. When control lever 11''' is rotated through a given clockwise angular displacement by the flash unit being mounted on the camera body, shielding portion 17 no longer shields indicating member 8''', so that flash-photography diaphragm scale 10''' appears through indicating window 7 in place of daylight-photography diaphragm scale 9'''.

With the aforesaid arrangement, when both scales 9''', 10''' are selectively indicated through indicating window 7 due to the rotational movement of control lever 11''', only one of the scales need be moved, so that the space occupied by control lever 11''', when it is moved, is reduced to less than half that in a diaphragm setting device in which both scales are moved. As a result, the size of the camera is reduced with the embodiment of FIG. 9.

In the afore-described diaphragm setting devices, the switching from one scale to another scale is effected in cooperation with the attachment and removal of a flash unit to and from the camera body, respectively. However, such embodiments may be further modified. For instance, in the case of a camera having a flash means built therein, the switching from a daylight photography mode to a flash-photography mode and vice-versa, is effected by the operation of a switch provided in the camera body. In this respect, any means may be adopted for the switching of the scale means, as long as it is designed to cooperate with the switching from a daylight photography mode to a flash photography mode of the camera, and vice-versa.

Figure 10:
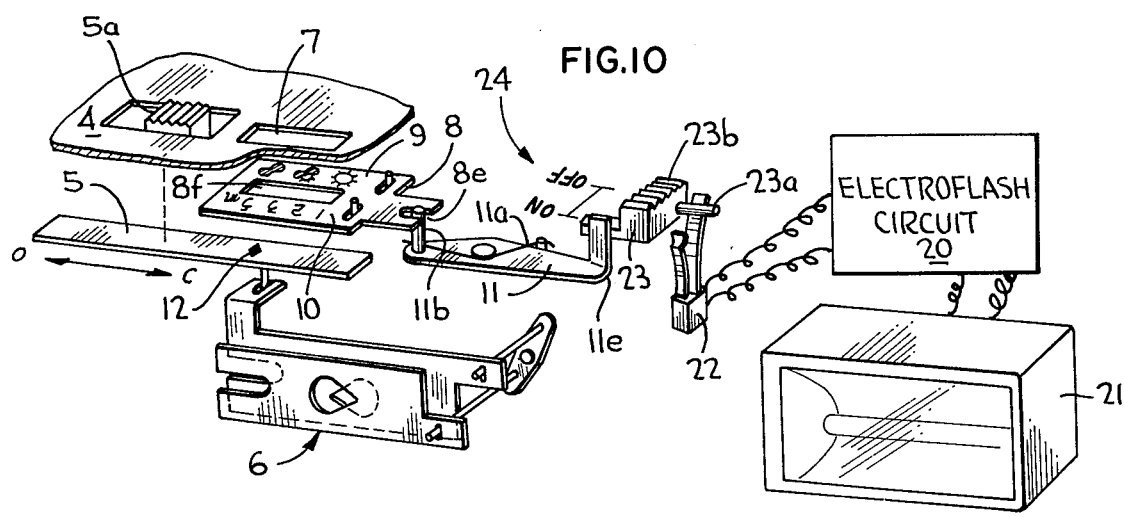
Figure 11:
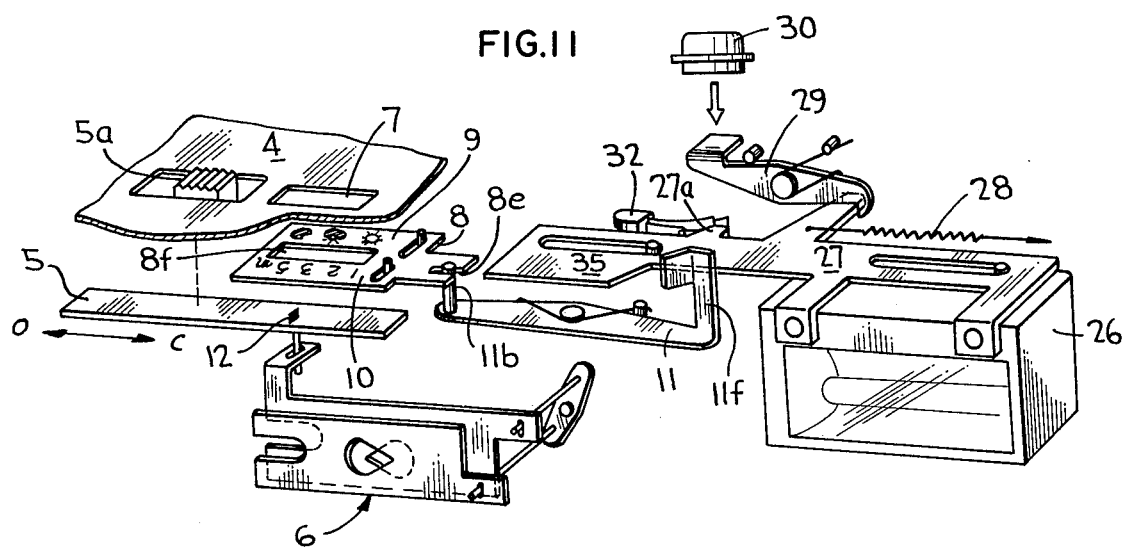

FIGS. 10 and 11 show further embodiments of the invention, wherein the cameras have built-in flash units. In this embodiment, the general construction of the diaphragm setting device remains unchanged, and thus like parts are designated like reference numerals with respect to the previously described embodiments.

Referring to FIG. 10, flash unit 21 is fixedly mounted on the camera body, with the emission of the light flash being controlled by electroflash circuit 20. Normally closed switch 22 is connected to electroflash circuit 20, so that the opening and closing of switch 22 controls electroflash circuit 20. When switch 22 is closed, electroflash circuit 20 is brought into an operating condition, thereby enabling emission of light from flash unit 21 commensurate with the shutter releasing operation. However, when switch 22 is open, then electroflash circuit 20 is brought to its inoperative condition, thereby disabling the emission of light from flash unit 21, even if a shutter releasing operation is carried out. Switch member 23 actuates switch 22 by pin 23a, and is provided with setting mark 23b on its head portion. Switch member 23 is manually movable, between OFF and ON positions of switching indexes 24, from outside the camera. Control lever 11 operates indicating member 8 as in the embodiment of FIG. 2; however, instead of control lever 11 being actuated by mounting of the flash unit, projection 11e of control lever 11 is positioned within the locus of movement of switching member 23. Thus, only when switch member 23 is moved to the ON position of switching index 24, is control lever 11 rotated in the clockwise direction.

With the aforesaid arrangement, when switch member 23 is moved to the ON position of switching index 24 from the daylight-photography mode shown, switch 22 is closed, so that flash unit 21 is brought to a light-emittable condition, in response to the shutter releasing operation, i.e., the camera is switched to the flash photography mode, whereupon control lever 11 is rotated clockwise to slidingly move indicating member 8, so that flash-photography diaphragm scale 10 appears through indicating window 7, instead of daylight-photography diaphragm scale 9.

When switch member 23 is switched from the flash-photography mode to the OFF position of switching index 24, then switch 22 is opened, so that the camera is switched to the daylight photography mode, whereupon control lever 11 is rotated counterclockwise. As a result, daylight-photography diaphragm scale 9 on indicating member 8 is switched back into position to be viewed within indicating window 7.

FIG. 11 shows an embodiment, in which a flash means is built in the camera and is movable to a given extent. In FIG. 11, flash means 26 is secured to sliding plate 27 which is slidingly movable in a direction at a right angle to the photographic optical axis. Flash unit 26 is movable between a housed position within the contour of the camera body and a projected or extended position outside the camera body, with each position being respectively obtained at the opposite extremity of the stroke of sliding plate 27. Sliding plate 27 is biased in the direction remote from the photographic optical axis by spring 28, and locked in its housed position by locking lever 29, with spring 28 under tension. Thus, when sliding plate 27 is released from a locked condition with locking lever 29, sliding plate 27 is moved to its projected or extended position under the restoring force of spring 28. Switching button 30 is adapted to operate locking lever 29 and is biased by a spring (not shown), to project from the camera body. Only when switching button 30 is depressed, is locking lever 29 moved to release sliding plate 27 from its locked condition. Switch 32 is adapted to control the electroflash circuit in the same manner described as switch 23 with reference to the preceding embodiment. When sliding plate 27 is shifted from its housed position to its projected or extended position, switch 32 is closed, as projection 27a on sliding plate 27 is disengaged therefrom, to bring the electroflash circuit (not shown) into an operable condition. Control lever 11 is adapted to slidingly move indicating member 8 and is pivoted to the camera body as in the case of the control lever in the embodiment of FIG. 2, with projection 11f of lever 11 being positioned within the locus of movement of cam portion 35 on sliding plate 27. When sliding plate 27 is moved under the tension of spring 28, cam portion 35 engages projection 11f of control lever 11, thereby rotating control lever 11.

As shown in FIG. 11, the camera is in the daylight photography mode and when switching button 30 is depressed, then sliding plate 27 is released from its locked condition with locking lever 29, so that sliding plate 27 is moved under the tension of spring 28, thereby moving flash unit 26 to its projected or extended position. The movement of sliding plate 27 causes switch 32 to be closed, so that the camera is placed in the flash photography mode, while control lever 11 is rotated clockwise by means of cam portion 35. The clockwise rotation of control lever 11 causes indicating member 8 to slidingly move to a given extent, with the result that flash-photography diaphragm scale 10 appears through indicating window 7, in place of daylight-photography diaphragm scale 9.

To change the camera from a flash photography mode to a daylight photography mode, flash unit 26 projecting outside the camera body is pushed inwardly into the camera body. When flash unit 26 is pushed into its housed position, then sliding plate 27 is again locked by locking lever 29, whereupon switch 32 is opened by the engagement therewith of projection 27a, then the camera is shifted to the daylight photography mode. However, when sliding plate 27 is returned to its housed position, then projection 11f of control lever 11 is released from engagement with cam portion 35, so that control lever 11 is rotated clockwise by a spring, thereby causing indicating member 8 to slidingly move, so that daylight-photography diaphragm scale 9 again appears through indicating window 7.

What is claimed is:

1. In a camera, wherein a flash means is removably mounted on the camera body and a diaphragm aperture is manually adjustable, apparatus comprising:
    a diaphragm setting member movable for varying said diaphragm aperture and including an index;
    first scale means including a plurality of symbols for indicating a set position of said diaphragm setting member for daylight photography;
    second scale means including a plurality of symbols for indicating a set position of said diaphragm setting member for flash photography;
    indicating means selectively movable between a first position to expose all the symbols of only said first scale means and said index and a second position to expose all the symbols of only said second scale means and said index; and
    control means operated upon attachment and removal of said flash means to and from the camera body respectively, said indicating means being interlocked with said control means for movement to said first position with said flash means attached to said camera body, and for movement to said second position with said flash means removed from said camera body.

2. Apparatus as in claim 1, wherein said first scale means and said second scale means are fixedly attached to the camera body; and said indicating means is a shielding member movable to selectively shield said first or said second scale means.

3. Apparatus as in claim 1, wherein said indicating means includes an indicating window in the camera body, and a movable member for carrying said first and second scale means between first and second positions for selectively exposing said first scale means or said second scale means within said indicating window.

4. Apparatus as in claim 3 wherein said control means includes a control lever actuable between a rest position and an operative position, said movable member being coupled to said control lever for slidable movement between said first and second positions, corresponding respectively to said rest and operative positions of said control lever.

5. Apparatus as in claim 3 wherein said control means includes a control lever, said movable member being rotatable about an axis parallel to said indicating window and including at least two surfaces angled with respect to one another, said movable member being coupled to said control lever to be rotated thereby, one of said surfaces being substantially parallel to said indicating window in said first position and the other of said surfaces being substantially parallel to said indicating window in said second position.

6. Apparatus as in claim 1, wherein one of said first scale means or said second scale means is fixedly mounted on the camera body in a position to be visible from outside the camera body; and said indicating means includes a shielding member bearing thereon the other of said scale means which is visible from outside the camera body, said shielding member respectively shielding and unshielding the other scale means in said first and second positions.

7. In a camera wherein a diaphragm aperture is manually adjustable, apparatus comprising:
flash means including a light emitting portion which is fixedly mounted on said camera body;
a movable diaphragm setting member for varying the diaphragm aperture and including an index;
first scale means including a plurality of symbols for indicating a set position of said diaphragm setting member for daylight photography;
second scale means including a plurality of symbols for indicating a set position of said diaphragm setting member for flash photography;
indicating means selectively movable between a first position to expose all the symbols of only said first scale means and said index, and a second position to expose all of the symbols of only said second scale means and said index; and
switch means for switching said flash means from a flash photography mode enabling flash emission from said all of said symbols of only said second scale member and said index; and
control means for switching said flash means from a flash photography mode enabling flash emission from said light emitting portion with release of the camera shutter, and to a daylight photography mode disabling the flash emission from said light emitting portion even with shutter release, and for switching from a daylight photography mode to a flash photography mode; said control means coacting with said indicating means, thereby shifting said indicating means to said first position with said control means setting said flash means to a daylight photography mode, and to said second position with said control means setting said flash means to a flash photography mode.

8. Apparatus as in claim 7, wherein said flash means includes a flash control circuit and a switch movable to an open position and a closed position for controlling said flash control circuit, and a switch actuating member for actuating said switch and movable between a flash photography position to close said switch, and a daylight photography position to open said switch to disconnect said flash circuit.

9. Apparatus as in claim 8, wherein said first scale means and said second scale means are fixedly attached to the camera body; and said indicating means consists of a shielding member movable to selectively shield said first and second scale means.

10. Apparatus as in claim 8, wherein said indicating means includes an indicating window in the camera body, and a movable member for carrying said first scale means and said second scale means between first and second positions for selectively exposing said first scale means or said second scale means in said indicating window.

11. Apparatus as in claim 8, wherein one of said first scale means or said second scale means is fixedly mounted on the camera body in a position to be visible from outside the camera body; and said indicating means includes a shielding member bearing thereon the other of said scale means which is visible from outside the camera body, said shielding member respectively shielding and unshielding the other scale means in said first and second positions.

12. In a camera wherein a diaphragm aperture is manually adjustable, apparatus comprising:
flash means including a light-emitting portion movable between a housed position within the camera body and spaced a given distance from the photographic optical axis, and an extended position spaced a greater distance than said given distance from said photographic optical axis;
a diaphragm setting member movable to vary the diaphragm aperture and including an index;
first scale means including a plurality of symbols for indicating a set position of said diaphragm setting member for daylight photography;
second scale means including a plurality of symbols for indicating a set position of said diaphragm setting member for flash photography;
indicating means selectively movable between a first position to expose all of said symbols of only said first scale means and said index, and a second position to expose light-emitting portion, when the shutter of the camera is released, to a daylight photography mode disabling flash emission from said light-emitting portion and vice-versa, even with release of the camera shutter, said switch means coacting with said indicating means, thereby shifting said indicating means to said first position, with said switch means setting said flash means to a daylight photography mode, and to said second position, with said switch means setting said flash means to a flash photography mode.

13. Apparatus as in claim 12, wherein said light emitting portion in biased in the direction from said housed position towards said extended position; and said control means includes a locking member to lock said light emitting portion in said housed position and an operating member operable from outside the camera body for releasing said light emitting portion from engagement with said locking member.

14. Apparatus as in claim 13, wherein said flash means includes a switch movable to open and closed positions, and forming a flash circuit in said closed position, said switch being closed by the shifting of said light emitting portion from said housed position to said extended position in response to the releasing movement of said locking member.

15. Apparatus as in claim 13, wherein said first scale means and said second scale means are fixedly attached to the camera body; and said indicating means is a shielding member movable to selectively shield one of said first or second scale means.

16. Apparatus as in claim 13 wherein said indicating means includes an indicating window in the camera body, and a movable member for carrying said first and second scale means between first and second positions from selectively exposing said first scale means or said second scale means within said indicating window.

17. Apparatus as in claim 16 wherein said control means includes a control lever actuable between a rest position and an operative position, said movable member being coupled to said control lever for slidable movement between said first and second positions, corresponding respectively to said rest and operative positions of said control lever.

18. Apparatus as in claim 16 wherein said control means includes a control lever, said movable member being rotatable about an axis parallel to said indicating window and including at least two surfaces angled with respect to one another, said movable member being coupled to said control lever to be rotated thereby, one of said surfaces being substantially parallel to said indicating window in said first position and the other of said surfaces being substantially parallel to said indicating window in said second position.

19. Apparatus as in claim 13, wherein one of said first scale means or said second scale means is fixedly mounted on the camera body in a position to be visible from outside the camera body; and said indicating means includes a shielding member bearing thereon the other of said scale means which is visible from outside the camera body, said shielding member respectively shielding and unshielding the other scale means in said first and second positions.

* * * * *